US008688982B2

(12) United States Patent
Gagnon et al.

(10) Patent No.: US 8,688,982 B2
(45) Date of Patent: Apr. 1, 2014

(54) MONITORING BASED ON CLIENT PERSPECTIVE

(75) Inventors: Bernard Gagnon, St-Hubert (CA);
 Didier Tremblay, Montreal (CA); Joe Pei-Wen Hsy, Menlo Park, CA (US);
 Christopher Viaggi, Mountain View, CA (US); Pierre Larose,
 St-Basile-Le-Grand (CA)

(73) Assignee: BMC Software, Inc., Houston, TX (US)

( * ) Notice: Subject to any disclaimer, the term of this patent is extended or adjusted under 35 U.S.C. 154(b) by 266 days.

(21) Appl. No.: 13/174,464

(22) Filed: Jun. 30, 2011

(65) Prior Publication Data

US 2012/0042164 A1 Feb. 16, 2012

Related U.S. Application Data

(60) Provisional application No. 61/373,727, filed on Aug. 13, 2010.

(51) Int. Cl.
 *H04L 9/32* (2006.01)
 *G06F 15/173* (2006.01)
 *G06F 11/00* (2006.01)

(52) U.S. Cl.
 USPC .......................... 713/168; 709/224; 370/253

(58) Field of Classification Search
 USPC .......................................... 713/168; 709/224
 See application file for complete search history.

(56) References Cited

U.S. PATENT DOCUMENTS

| 5,521,907 | A | | 5/1996 | Ennis, Jr. et al. |
| 5,781,449 | A | * | 7/1998 | Rosborough .................. 709/224 |
| 5,838,920 | A | | 11/1998 | Rosborough |
| 5,870,557 | A | * | 2/1999 | Bellovin et al. ................ 709/224 |
| 6,363,477 | B1 | * | 3/2002 | Fletcher et al. ................ 713/151 |
| 6,446,200 | B1 | * | 9/2002 | Ball et al. ............................ 713/1 |
| 6,457,143 | B1 | * | 9/2002 | Yue ................... 714/43 |
| 6,801,940 | B1 | * | 10/2004 | Moran et al. ................... 709/224 |
| 7,506,368 | B1 | * | 3/2009 | Kersey et al. .................... 726/12 |
| 8,005,011 | B2 | * | 8/2011 | Yang ............................... 370/253 |
| 8,266,276 | B1 | | 9/2012 | Vasudeva |
| 2003/0043844 | A1 | * | 3/2003 | Heller ........................... 370/466 |

(Continued)

FOREIGN PATENT DOCUMENTS

| WO | 03/038622 A1 | 5/2003 |
| WO | 03/084134 A1 | 10/2003 |

OTHER PUBLICATIONS

European Search Report for European Application No. 12199311.7, dated Mar. 21, 2013, 5 pages.

(Continued)

*Primary Examiner* — Cordelia Zecher
*Assistant Examiner* — Abdullah Almamun
(74) *Attorney, Agent, or Firm* — Brake Hughes Bellermann LLP

(57) ABSTRACT

According to one general aspect, a method may include establishing a network tap point near, in a network topology sense, an intranet/internet access point device. The network tap point may provide a substantially non-intrusive means of viewing network communication through the intranet/internet access point. The method may include monitoring, via the network tap point, at least partially encrypted network communication between a client computing device that is within the intranet and server computing device that is within the internet. The method may also include analyzing the monitored at least partially encrypted network communication to generate at least one set of metrics regarding the performance of the network communication between the client computing device and server computing device.

16 Claims, 10 Drawing Sheets

(56) References Cited

U.S. PATENT DOCUMENTS

| | | | |
|---|---|---|---|
| 2003/0145079 A1 | 7/2003 | Breese et al. | |
| 2004/0168050 A1* | 8/2004 | Desrochers et al. | 713/153 |
| 2004/0221034 A1* | 11/2004 | Kausik et al. | 709/224 |
| 2005/0050316 A1* | 3/2005 | Peles | 713/151 |
| 2005/0050362 A1* | 3/2005 | Peles | 713/201 |
| 2006/0211416 A1* | 9/2006 | Snyder et al. | 455/423 |
| 2007/0028094 A1* | 2/2007 | Sugiyama | 713/155 |
| 2007/0258468 A1* | 11/2007 | Bennett | 370/400 |
| 2008/0279097 A1* | 11/2008 | Campion et al. | 370/229 |
| 2010/0088404 A1 | 4/2010 | Mani et al. | |
| 2010/0211675 A1* | 8/2010 | Ainali et al. | 709/224 |
| 2011/0099620 A1* | 4/2011 | Stavrou et al. | 726/12 |
| 2011/0119375 A1* | 5/2011 | Beeco et al. | 709/224 |
| 2012/0042064 A1 | 2/2012 | Gagnon et al. | |
| 2013/0173778 A1 | 7/2013 | Hsy et al. | |

OTHER PUBLICATIONS

European Office Action for European Application No. 12199311.7, dated Apr. 4, 2013, 6 pages.

Emeakaroha, Vincent C. et al, "Low Level Metrics to High Level SLAs—LoM2HiS Framework: Bridging the Gap Between Monitored Metrics and SLA Parameters in Cloud Environments", IEEE, 2010, 7 pages.

Kandukuri, Balachandra Reddy et al., "Cloud Security Issues", IEEE International Conference on Services Computing, 2009, 4 pages.

U.S. Office Action for U.S. Appl No. 13/174,473, dated Jul. 11, 2013, 14 pages.

International Search Report and Written Opinion for International Application No. PCT/US2013/033361, dated Jun. 21, 2013, 14 pages.

Wei, Jianbin et al, "Measuring Client-Perceived Pageview Response Time of Internet Services", IEEE Transactions on Parallel and Distributed Systems, vol. 22, No. 5, May 2011, 15 pages.

* cited by examiner

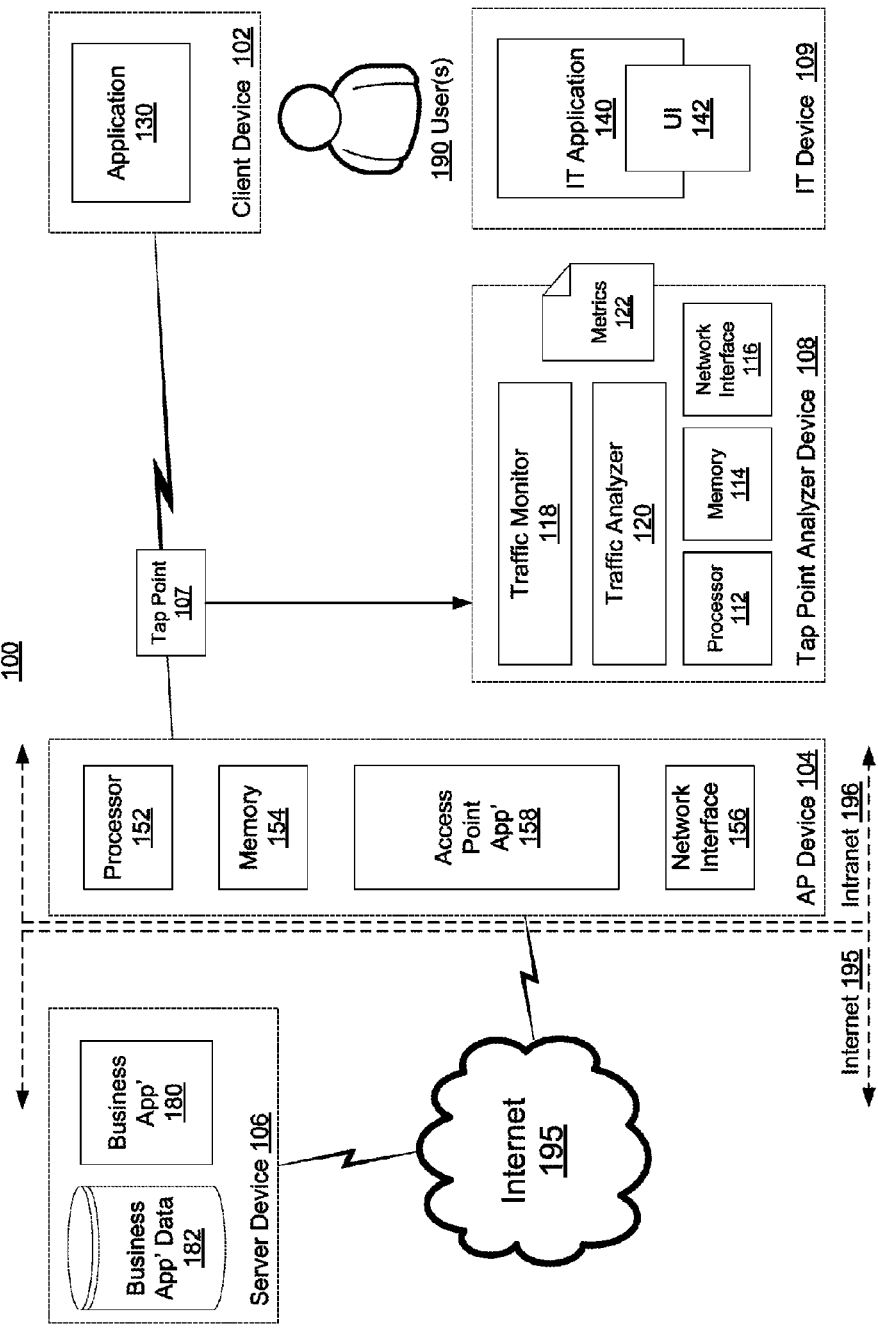

200a

200c

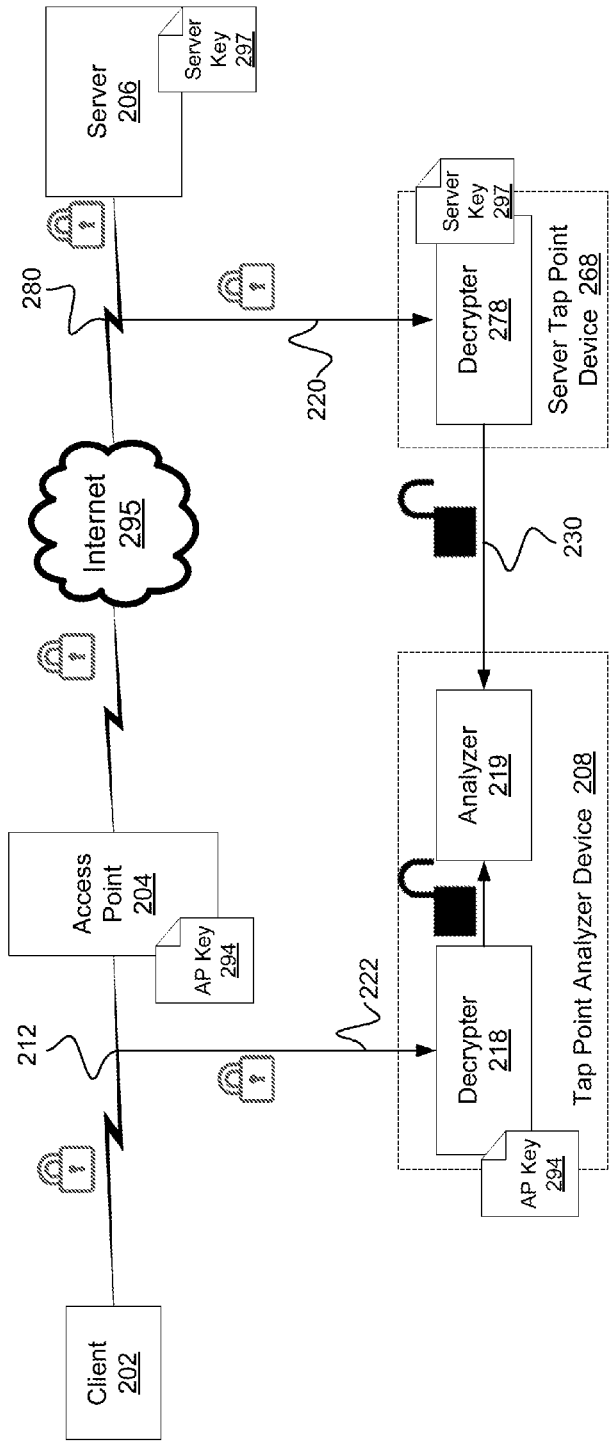

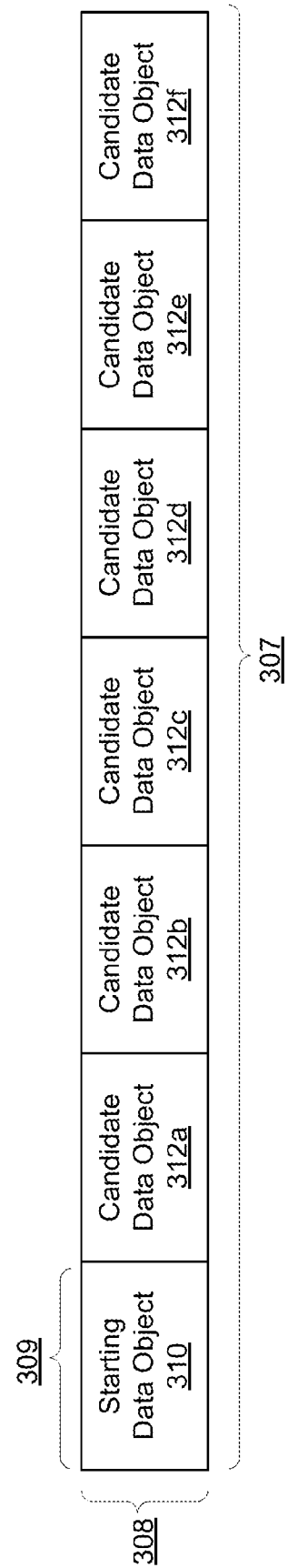

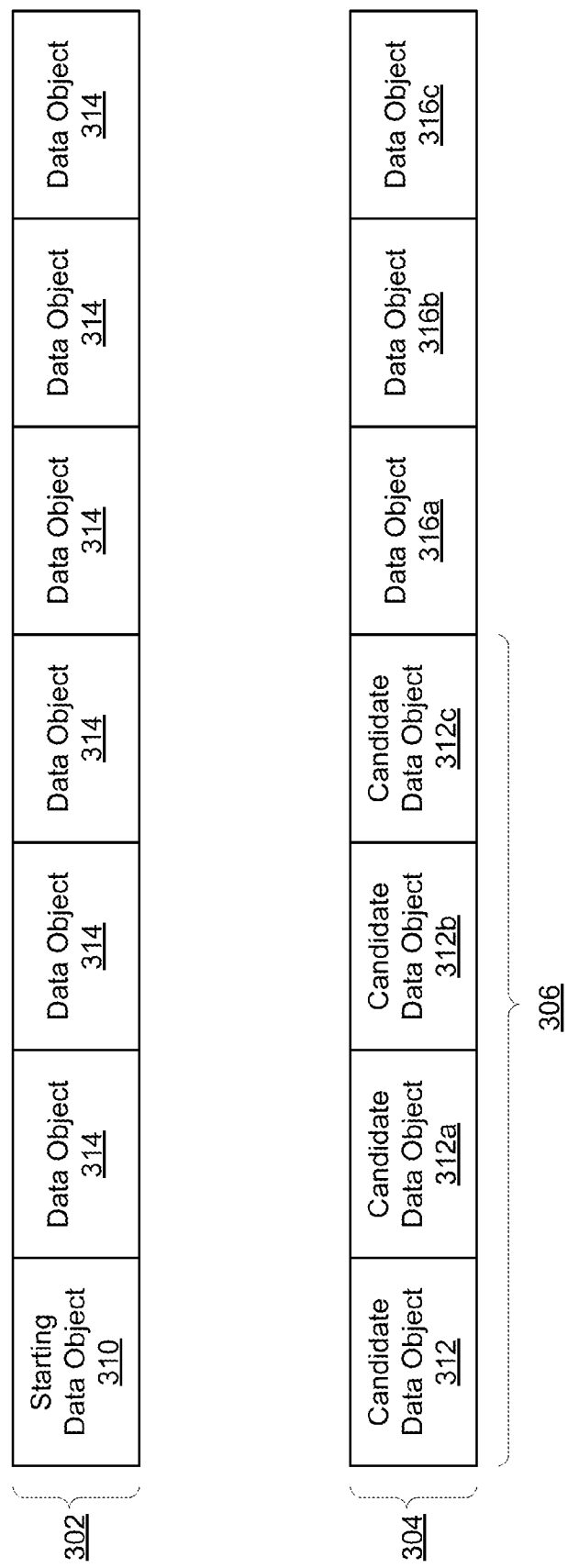

500

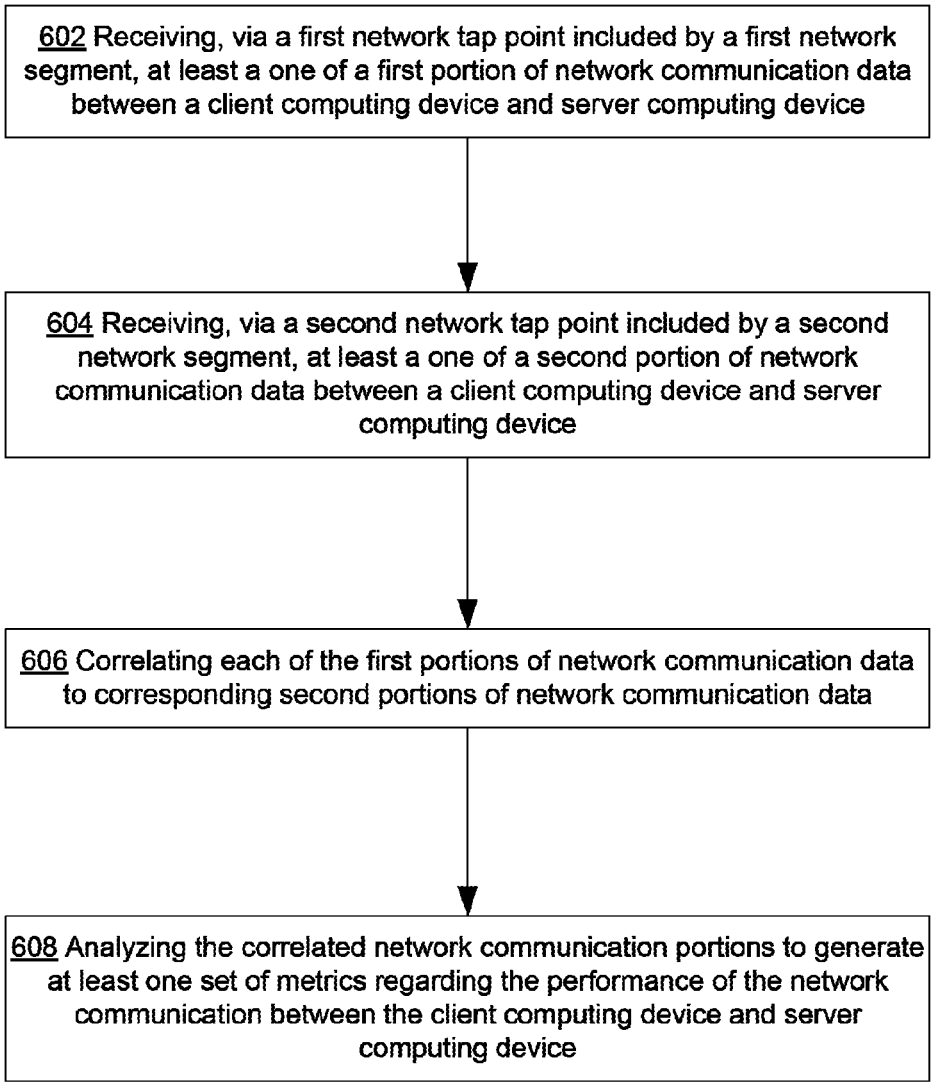

MONITORING BASED ON CLIENT PERSPECTIVE

CROSS-REFERENCE TO RELATED APPLICATION

This application claims priority under 35 U.S.C. §119 to Provisional Patent Application Ser. No. 61/373,727, entitled "SAAS MONITORING BASED ON PERSPECTIVE OF USER" filed on Aug. 13, 2010. The subject matter of this earlier filed application is hereby incorporated by reference.

TECHNICAL FIELD

This description relates to network performance, and more specifically to monitoring and analyzing the performance of communication between two network devices.

BACKGROUND

In a traditional software model, corporate information technology (IT) groups purchase software, deploy the software, and manage the software in its own data center. In such a model, the IT group is responsible for the performance and availability of the applications or purchased software. Traditionally, such IT groups use tools for monitoring the software applications in order to ensure consistent performance and availability.

Software as a service (SaaS), sometimes referred to as "on-demand software" or "Cloud software", is typically a software delivery model in which software and its associated data are hosted centrally (typically in the Internet or cloud) and are typically accessed by users from a computing device (e.g., desktop, laptop, netbook, tablet, smartphone, etc.) using a web browser over the Internet. SaaS has become a common delivery model for many business applications, including accounting, collaboration, customer relationship management (CRM), enterprise resource planning (ERP), invoicing, human resource management (HRM), content management (CM) and service desk management, etc. SaaS has been incorporated into the strategy of many leading enterprise software companies.

However, in the SaaS services model, in which the software is often provided as a service by a third party, end-user organizations frequently subscribe directly with a software provider. As such, an end-user generally directly contacts the SaaS provider to provide the software with a certain level of performance or availability.

However, often the end-users have neither the skills nor the economic resources to actively track such SaaS service levels. Nor would they generally have the tools to track such levels even if they wanted to. Frequently, there are no consistent service level agreements (SLAs) from a corporate perspective and even where there are SLAs, there are few tools to track performance let alone enforce service levels. As such, corporations frequently can no longer count on their IT groups to be responsible for the operations and management of mission critical applications. Often the IT group is reduced to merely supporting network and desktop access to SaaS providers, and not the performance of the SaaS applications themselves. Frequently, SaaS providers are now responsible for the application's performance and the corporate IT groups may not even have a direct relationship with the SaaS provider.

SUMMARY

According to one general aspect, a method may include establishing a network tap point near, in a network topology sense, an intranet/internet access point device. The network tap point may provide a substantially non-intrusive means of viewing network communication through the intranet/internet access point. The method may include monitoring, via the network tap point, at least partially encrypted network communication between a client computing device that is within the intranet and server computing device that is within the internet. The method may also include analyzing the monitored at least partially encrypted network communication to generate at least one set of metrics regarding the performance of the network communication between the client computing device and server computing device.

According to another general aspect, an apparatus may include a network tap point and a processor. The network tap point may be configured to duplicate, in a non-intrusive manner, at least part of a network communication transmitted to and from an access point device that forms the boundary between a first network and a second network. The processor may be configured to monitor, via the network tap point, at least partially encrypted network communication that is between a client computing device that is within the first network and server computing device that is within the second network, and analyze the monitored at least partially encrypted network communication to generate at least one set of metrics regarding the performance of the network communication between the client computing device and server computing device.

According to another general aspect, a computer program product for managing a network may be tangibly embodied on a computer-readable medium. The computer program product may include executable code that, when executed, is configured to cause an apparatus to: monitor, via a network tap point, at least partially encrypted network communication between a client computing device that is within a first network and server computing device that is within a second network; and analyze the monitored at least partially encrypted network communication to generate at least one set of metrics regarding the performance of the network communication between the client computing device and server computing device.

According to one general aspect, a method may include receiving, via a first network tap point included by a first network segment, a first portion of network communication data between a client computing device and a server computing device. The method may include receiving, via a second network tap point included by a second network segment, a second portion of network communication data between the client computing device and the server computing device. The method may include attempting to correlate each sub-portion of the first portion of network communication data to corresponding sub-portion of the second portion of network communication data. The method may also include analyzing the correlated network communication sub-portions to generate at least one set of metrics regarding the performance of the network communication between the client computing device and server computing device.

According to another general aspect, an apparatus may include a network interface and a processor. The network interface may be configured to receive a first portion of network communication data transmitted via a first network segment, and between a client computing device and a server computing device, and receive a second portion of network communication data transmitted via a second network segment, and between the client computing device and the server computing device. The processor may be configured to attempt to correlate each sub-portion of the first portion of network communication data to corresponding sub-portion of the second portion of network communication data, and analyze the correlated network communication sub-portions to generate at least one set of metrics regarding the performance of the network communication between the client computing device and server computing device.

According to another general aspect, a computer program product for managing a network may be tangibly embodied on a computer-readable medium. The computer program product may be include executable code that, when executed, is configured to cause an apparatus to: receive, via a first network segment, a first portion of network communication data between a client computing device and a server computing device; receive, via a second network segment, a second portion of network communication data between the client computing device and the server computing device; and attempt to correlate each sub-portion of the first portion of network communication data to corresponding sub-portion of the second portion of network communication data.

The details of one or more implementations are set forth in the accompanying drawings and the description below. Other features will be apparent from the description and drawings, and from the claims.

A system and/or method for monitoring network performance, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2d is a block diagram of an example embodiment of a system in accordance with the disclosed subject matter.

FIG. 3a is a block diagram of an example embodiment of a data structure in accordance with the disclosed subject matter.

FIG. 3b is a block diagram of an example embodiment of a data structure in accordance with the disclosed subject matter.

FIG. 6 is a flowchart of an example embodiment of a technique in accordance with the disclosed subject matter.

Like reference symbols in the various drawings indicate like elements.

DETAILED DESCRIPTION

Figure 2A:
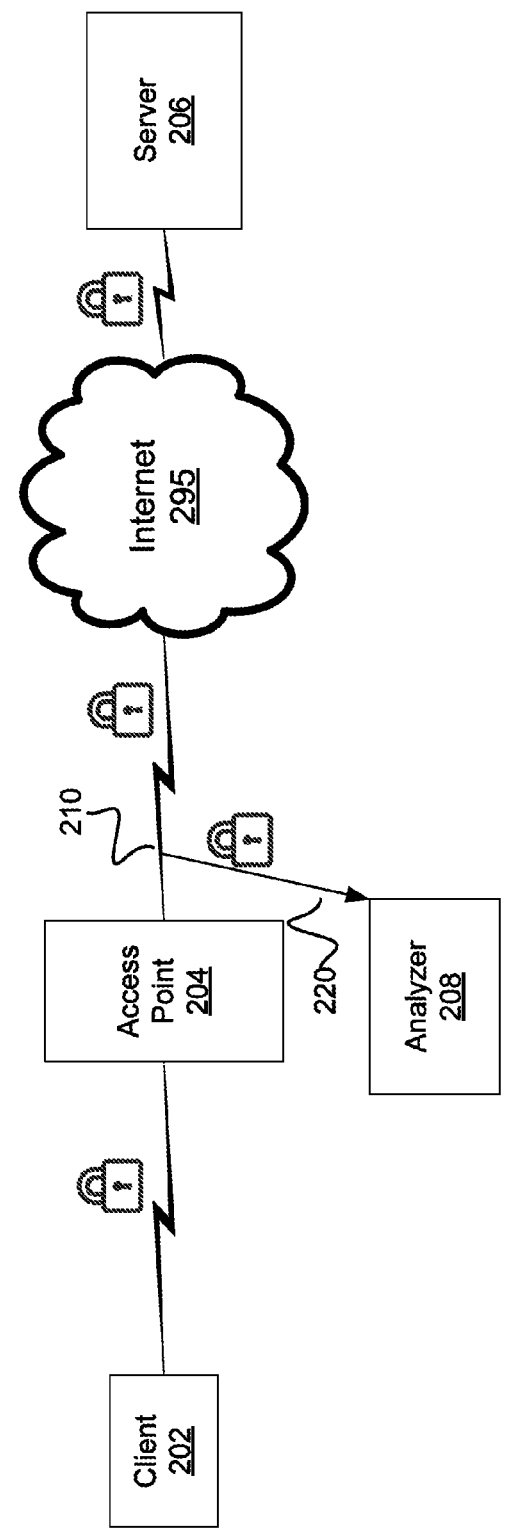
FIG. 2a is a block diagram of an example embodiment of a system in accordance with the disclosed subject matter.

FIG. 1 is a block diagram of an example embodiment of a system 100 in accordance with the disclosed subject matter. In various embodiments, the system 100 may include two or more communications networks. In the illustrated embodiment, the system 100 may include an intranet 196 and an internet 195. However, it is understood that the above is merely one illustrative example to which the disclosed subject matter is not limited. Further, it is understood that, while two networks or network segments 195 and 106 are illustrated, the disclosed subject matter is not limited to any number of such network or network segments.

In various embodiments, the system 100 may include a first communications network (e.g., intranet 196, etc.) that includes a client computing device 102. Typically, this first communications network 196 may be under the control of a single IT group or business unit. In various embodiments, the system 100 may include a second communications network (e.g., internet 195, etc.) that includes, at least from the point of view of the client computing device 102, the server computing device 106. Typically, this second communications network 195 may not be under the control of the IT group or business unit. It is understood that the above are merely a few illustrative examples to which the disclosed subject matter is not limited.

In various embodiments, the system 100 may include a server computing device or server 106 configured to provide a service (e.g., a web server, a SaaS application, etc.). In one embodiment, the server computing device 106 may include a processor, memory, and network interface (not shown, but analogous to those of device 104). In the illustrated embodiment, the server computing device 106 may provide and include the business application 180 and the business application data 182. In various embodiments, this business application 180 may include a SaaS application (e.g., a CRM, an ERP, a HRM, a CM, etc.). It is understood that, while one server 106 is illustrated, the disclosed subject matter is not limited to any number of such devices. Further, it is understood that the devices 102, 104, 106, 108 and 109 may include instantiations of such devices included in respective virtual or modular environments (e.g., a blade server system, virtual machines, etc.).

In various embodiments, the system 100 may include a client computing device or client 102 configured to consume or make use of the service (e.g., business application 180, SaaS application, etc.) provided by the server 108. In one embodiment, the client 102 may include a processor, memory, and network interface (not shown, but analogous to those of device 104). In various embodiments, the client 108 may include or execute an application 130 (e.g., a web browser, etc.) that accesses or displays the service or application 180 provided by the server 106. In some embodiments, the client 102 may be controlled or used by a user 190. In various embodiments, the client 102 may include a traditional computer (e.g., a desktop, laptop, netbook, etc.) or a non-traditional computing device (e.g., smartphone, tablet, thin client, computer terminal, etc.). It is understood that while only one client 102 is illustrated the disclosed subject matter is not limited to any particular number of client devices 102.

In various embodiments, the system 100 may include an access point (AP) device or intranet/internet AP device 104. In such an embodiment, the AP device 104 may be configured to separate the first and second networks (e.g., intranet 196 and internet 195, etc.). In various embodiments, the AP device 104 may include a router, a firewall, a proxy server, etc. or a combination thereof. It is understood that the above are merely a few illustrative examples to which the disclosed subject matter is not limited.

In various embodiments, the AP device 104 may include a processor 152 configured to execute a stream or machine executable instructions (e.g., operating system, application 158, etc.).

The AP device 104 may include a memory 154 configured to store data and/or instructions. In various embodiments, the memory 154 may include volatile memory, non-volatile memory, or a combination thereof. The memory 154 or portions thereof may be configured to store data in a temporary fashion (e.g., Random Access Memory (RAM), etc.) as part of the execution of instructions by the processor 152. The memory 154 or portions thereof may be configured to store data in a semi-permanent or long-term fashion (e.g., a hard drive, solid-state memory, flash memory, optical storage, etc.).

In various embodiments, the AP device 104 may include one or more network interfaces 156 configured to communicate with other devices (e.g., server 104, client 102, etc.) via a communications network. In various embodiments, this communications network may employ wired (e.g., Ethernet, Fibre Channel, etc.) or wireless (e.g., Wi-Fi, cellular, etc.) protocols or standards or a combination thereof.

In one embodiment, the AP device 104 may include a device or AP application 158 that acts as an intermediary between the client 102 and the server 106. In the illustrated embodiment, which illustrates the AP device 104 as a proxy server, the client 102 may make a request to the AP device 104 to access the server 108 on behalf of the client 102. In such an embodiment, the AP device 104 may then forward (often repackaging or encapsulating) the communication from the client 102 to the server 106. Likewise, the server 106 may contact the AP device 104 with information or data that is to be forwarded to the client 102.

In such an embodiment, communication between the server 106 and the client 102 may take place in two parts. A client-side portion or part may occur between the client 102 and the AP device 104 via the intranet 196. A server-side portion may occur between the server 106 and the AP device 104 via the internet 195. In combination, these client and server side portions may constitute the communication between the two devices 102 and 106 across the two networks 195 and 196.

Often, one or both of these client-side and server-side portions may be encrypted. In such an embodiment, each of the respective encrypted portions of the network communication may include their respective encryption keys or security credentials.

For example, communication between the server 106 and the AP device 104 may be encrypted via the Hypertext Transfer Protocol (HTTP) Secure (HTTPS) protocol which makes use of the Secure Sockets Layer (SSL) and/or Transport Layer Security (TLS) protocols to provide encrypted communication and secure identification between two networked devices. It is understood that the above is merely one illustrative example to which the disclosed subject matter is not limited.

Likewise, in one embodiment, communication between the client 102 and the AP device 104 may be also encrypted (e.g., via HTTPS, etc.). In such an embodiment, the two communication portions (client-side and server-side) may employ different encryption keys or security credentials. In another embodiment, the communication between the client 102 and the AP device 104 may not be encrypted. In a less preferred embodiment, the communication between the server 106 and the AP device 104 may not be encrypted. In yet another embodiment, some parts of the communication between the server 106 and the AP device 104 may not be encrypted while other parts may be encrypted. For example, an application 180 may include or generate content that includes an unsecure portion (e.g., public information, such as generic images via HTTP, etc.) and a private or confidential information (e.g., financial information via HTTPS, etc.), each portion involving unencrypted and encrypted network communication respectively.

In the illustrated embodiment, an IT department or other entity may wish to monitor and analyze the network communication between the client 102 and the server 104. In order to do this, the IT department or other entity may place a network tap point 107 on a network (e.g., 196, etc.). In this context, a "network tap point" includes a substantially non-invasive means of viewing or monitoring network communication through the portion of the network where the network tap point 107 has been placed. In the illustrated embodiment, the network tap point 107 is placed such that any network communication traversing the AP device 104 is monitored or viewed. However, placing a single network tap point 107 on the intranet 196 side of the AP device 104 may not be a preferred embodiment. Other embodiments are shown and discussed in reference to FIGS. 2A, 2B, 2C, and 2D, as described below. It is understood that the above are merely a few illustrative examples to which the disclosed subject matter is not limited.

In various embodiments, the network tap point 107 may include a physical connection that splits or duplicates an incoming network signal and therefore any network communication transmitted via that network signal into two or more outgoing network signals. In such an embodiment, one of the outgoing network signals may be transmitted to its normal destination (e.g., AP device 104 or client device 102, etc.) and the second outgoing network signal may be transmitted to a tap, snooping, or listening device (e.g., tap point analyzer device 108, etc.). In such an embodiment, any delay added to the network communications signal may be minimal or substantially unnoticeable and the network signal may be unaltered or unprocessed. As such, the network tap point 107 may perform in a substantially non-intrusive manner.

In various embodiments, the network tap point 107 may be placed near, in a network topology sense, to the AP device 104 so as to capture or duplicate network communication passing through the AP device 104 or across the boundary between the two networks (e.g., an internet 195/intranet 196 boundary, etc.). This may differ from other network tap points that are traditionally placed near the server 106 (e.g., with a majority of the internet 195 between the server 106 and the AP device 104) and, therefore, only provide information regarding the network communication as seen by the server 106. In the illustrated embodiment, the network tap point 107 may provide a view of the server 106/client 102 network communication from a point of view closer to the client 102 or the AP device 104. It is understood that the above is merely one illustrative example to which the disclosed subject matter is not limited.

In one embodiment, the tap point analyzer device 108 may include a processor 112, memory 114, and network interface 116, analogous to those described above. As described above, in various embodiments, the memory 114 may include volatile storage (e.g., random access memory etc.), non-volatile storage (e.g., a hard drive, a solid-state drive, etc.), or a combination thereof. In some embodiments, the tap point analyzer device 108 may include the network tap point 107.

In various embodiments, the tap point analyzer device 108 may be configured to monitor and analyze both encrypted and/or unencrypted network communication. In such an embodiment, the tap point analyzer device 108 may generate a set of metrics 122 regarding the performance of the network communication between the client 102 and the server 106. These metrics 122 may be transmitted or displayed within a user interface (UI) 142 of an IT application 140 that is executed by an IT computing device 109. In various embodiments, the IT computing device 109 may include a traditional computer (e.g., a desktop, laptop, netbook, etc.) or a non-traditional computing device (e.g., smartphone, tablet, thin client, computer terminal, etc.).

In one embodiment, the tap point analyzer device 108 may include a traffic monitor 118 configured to monitor network communication captured or duplicated by the network tap point 107. In various embodiments, this network communication may include encrypted network communication between the client 102 and the server 104. In the illustrated embodiment, the encrypted communication may include a portion of the client/server communication that occurs between the client 102 and the AP device 104. In a more preferred embodiment (e.g., the system 200a of FIG. 2A), the tap point 107 may be placed to capture encrypted communication between the server 106 and the AP device 104. It is understood that the above are merely a few illustrative examples to which the disclosed subject matter is not limited.

In some embodiments, as described below in reference to FIGS. 2b, 2c, and 2d, the traffic monitor 118 may be configured to decrypt all or part of the network communication captured by one or more network tap points. In other embodiments, as described below in reference to FIGS. 2a, and 2b, the traffic monitor 118 may not be configured to decrypt all or part of the network communication captured by a network tap point, but may still monitor and analyze such traffic. This is contrasted with traditional network communication monitoring schemes that generally discard or do not monitor encrypted network communication as the analyzer 120 or other portions of the tap point analyzer device 108 are incapable of processing encrypted network communication.

In one embodiment, the tap point analyzer device 108 may include a traffic analyzer 120 configured to analyze the monitored network communication and generate the set of metrics 122. In various embodiments, the set of metrics 122 may include information, such as, the latency added by the intranet 196 or the AP device 104, the performance of various servers 106, the availability of the server 106, the number of accesses or web pages requested from/provided by server 106, the number of errors, retransmissions, or otherwise failed network communication interactions (e.g., web page views, etc.) between the client device(s) 102 and the server 106, an overall quality value of the network communication (e.g., a synthetic or aggregated measurement of latency and errors, etc.), the bandwidth usage involving the server 104 or client 102, a determination of where in the network (e.g., the server 106, the AP device 104, the client 102, etc.) any errors occur, the number of times the server 106 is accessed (e.g., page views, etc.) in a given time period, the number of client devices 102 accessing the server 106 at any given time or time period, performance metrics by each of a plurality of servers 106 or intranets 196, etc. In various embodiments, these metrics may be compiled for the overall client/server communication, communications involving just one of the networks (e.g., server-to-AP device, client-to-AP device, etc.), or a combination thereof. It is understood that the above are merely a few illustrative examples to which the disclosed subject matter is not limited.

As described below, in various embodiments, the traffic analyzer 120 may be configured to match or correlate network communication from one side (e.g., client-side) of the internet 195/intranet 196 boundary with network communication from the other side (e.g., server-side) of the internet 195/intranet 196 boundary. As described below, this may include matching network communication from two tap points 107, one on each side of the internet 195/intranet 196 boundary based upon a predetermined set of criteria. In various embodiments, the monitored or captured network communication from one side (e.g., the server-side) may be encrypted and the tap point analyzer device 108 may not be able to decrypt that portion of the monitored network communication. In such an embodiment, the traffic analyzer 120 may still be configured to match or correlate, as best it can, the two portions (e.g., server-side and client-side) of the network communication.

In such an embodiment, once the various monitored data objects from the two sides of the network communications are matched with one another, their various metric values may be matched or summed to provide a more complete metric that takes into account the entire network communication not just the portion or side from which the respective data objects where monitored.

For example, a single data object or communication transaction may include a web page view having a request, fulfillment, and acknowledgment phases. That web page view communication may include two portions: a client-side portion between the client 102 and the AP device 104, and a server-side portion between the server 106 and the AP device 104. Both the client-side portion and the server-side portion may have their own respective performance metrics (e.g., latency, etc.). Because the web page view communication is split into two parts (client-side and server-side) it may not be possible to directly measure the, for example, latency or time from the start to the finish of the web page view communication as measured from the client 102 to the server 106. However, if the two sides or portions of the communication are matched, the client/server latency may be determined based upon the client/AP device latency (client-side latency) and the AP device/server latency (server-side latency), both of which may be measured directly. It is understood that the above is merely one illustrative example to which the disclosed subject matter is not limited.

FIG. 2a is a block diagram of an example embodiment of a system 200a in accordance with the disclosed subject matter. In various embodiments, the system 200a may include a client 202, an AP device 204, an internet or second network 295, and a server 206 which is accessed across or via the second network 295. The illustrated system 200a shows an embodiment in which the AP device 204 is not a proxy but simply a router or other device.

In such an embodiment, a tap point 210 may be placed near to, in a network topology sense, the server-side of the AP device 204. In the illustrated embodiment, the network communication between the client 202 and the server 206 may occur in an encrypted or at least partially encrypted manner (illustrated via the closed lock graphic).

In one embodiment, the system 200a may include a network tap point analyzer device 208. In such an embodiment, the network tap point analyzer device 208 may be configured to receive a copy of the network communication 220 captured or duplicated by the network tap point 210.

In various embodiments, the network tap point analyzer device 208 may not be capable of decrypting the network communication 220. Regardless, the network tap point analyzer device 208 may be configured to monitor the encrypted network communication 220 and not discard or ignore the encrypted network communication or data objects.

In this context, a "data object" includes a discrete portion of a network communication and may include a data packet, datagram, or frame, and may be measured in terms of bytes, bits, or characters. In various embodiments, the data object may include a header portion and a payload portion. In such an embodiment, the header portion may, at a minimum, indicate the immediate source and destination devices to which the data object is transmitted from/to, respectively (e.g., client device 202 and AP device 204, AP device 204 and server 206, etc.). The payload portion may include any information transmitted by the data object and may also include encapsulated routing or header information (e.g., in the case where the network communication in interrupted by or involves a proxy server, a virtual local area network information, a virtual private network information, etc.). In some embodiments, this payload portion may be encrypted. In various embodiments, network communication may include a stream or plurality of various data objects transmitting respective pieces of information between two devices (e.g., client 202 and server 206, etc.).

In various embodiments, in which the encrypted network communication is monitored, the analyzer device 208 may be configured to provide network performance metrics (e.g., latency, etc., as described above, etc.) based on the network portion between the tap point 210 and the server 206. In such an embodiment, the system 200a may be configured to provide server-side metrics or network performance statistics.

Figure 2B:
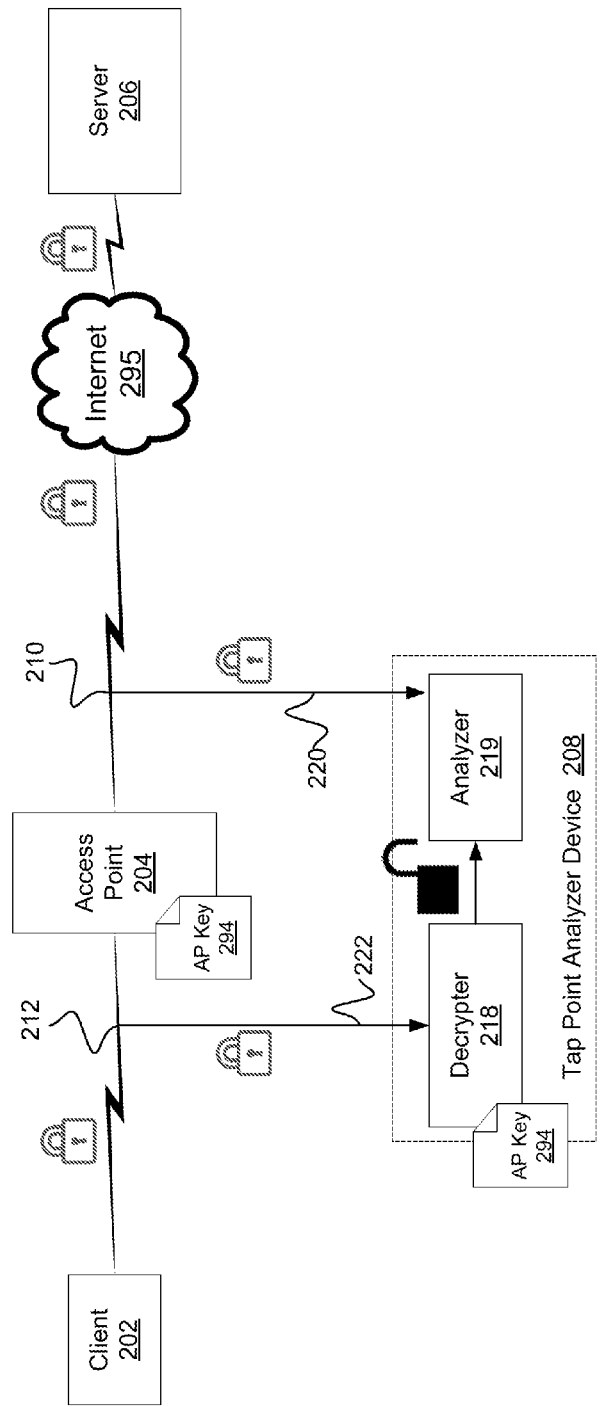
FIG. 2b is a block diagram of an example embodiment of a system in accordance with the disclosed subject matter.

FIG. 2b is a block diagram of an example embodiment of a system 200b in accordance with the disclosed subject matter. In various embodiments, the system 200b may include a client 202, an AP device 204, an internet or second network 295, and a server 206 which is accessed across or via the second network 295. In the illustrated embodiment, a system 200b shows an embodiment in which the AP device 204 is a proxy; although, it is understood that the above is merely one illustrative example to which the disclosed subject matter is not limited.

In the illustrated embodiment, two network tap points 210 and 212 are used or employed. A first or client-side network tap point 212 is placed within the intranet or first network segment between the client 202 and the AP device 204. In the illustrated embodiment, the client-side tap point 212 is placed near or at the AP device 204 as to monitor the full effect of the first network on the communication from/to the client 202. A second or server-side network tap point 210 is placed within the internet or second network segment between the server 206 and the AP device 204. In the illustrated embodiment, the server-side tap point 210 is placed near or at the AP device 204 as to monitor the full effect of the second network on the communication from/to the server 204.

In the illustrated embodiment, both the client-side and server-side network communication is encrypted (at least in part). For example, the client 202 may be a roaming device that connects to the intranet or first network segment via a virtual private network (VPN) or other encrypted means. In such an embodiment, the physical location or even network topology location of the client 202 may not be relevant as long as the client 202 is behind the client-side tap point 212.

In various embodiments, the encryption employed for the client-side network communication and the encryption employed for the server-side network communication may use or require different security credentials or keys. For example, the client-side encryption may use a form of public key encryption that makes use of a private key 294 of the AP device 204 that is constant across multiple encryption sessions and where the client 202 is given a session key (not shown) for each encryption session. Likewise, the server-side encryption may use a form of public key encryption that makes use of a private key (not shown) of the server 206 that is constant across multiple encryption sessions and where the AP device 204 is given a session key (not shown) for each encryption session.

As a result, it may not be possible, feasible, or desirable to obtain via tap point 210 the server-side session key(s). In such an embodiment, it may not be possible for the tap point analyzer device 208 to decrypt the encrypted server-side network communication or traffic. However, as described above, the tap point analyzer device 208 may continue to monitor and analyze the encrypted server-side network communication 220.

Regarding the client-side encrypted network communication or traffic, again it may not be possible, feasible or desirable to obtain via tap point 212 the client-side session key(s). However, as the AP device 204 may be maintained by the same IT group or entity as the tap point analyzer device 208, it may be possible to provide the tap point analyzer device 208 with the AP device 204's private key or security credentials 294. In various embodiments, other means of obtaining the proper security credentials or keys may be employed. In such an embodiment, the encrypted client-side network communication 222 may be decrypted (e.g., via a decrypter 218 portion of the tap point analyzer device 208, and indicated in the illustration by the open lock graphic). In various embodiments, a traffic monitor portion (shown in FIG. 1) of the tap point analyzer device 208 may include the decrypter 218.

In the illustrated embodiment, the analyzer 219 may be configured to provide a greater analysis and more accurate metrics than that of system 200a of FIG. 2a in which neither side of the client 202/server 206 network communication was decrypted and available for deeper analysis. In such an embodiment, the analyzer 219 may be configured to correlate or match data objects or portions from the decrypted client-side network communication with data objects or portions from the encrypted server-side network communications. In various embodiments, various metrics may be provided based upon these matched data objects that include metrics for the client 202/server 206 network communication as a whole, as well as metrics for each side or portion (client-side, server-side) of the network communication.

Due to the intermediary and forwarding nature of a proxy server (e.g., AP device 204, etc.), an original data object transmitted from the client 202 to the AP device 204 will result in corresponding forwarded data object from the AP device 204 to the server 206 (and likewise in reverse for the case of transmitting from the server 206 to the client 202). However, in the illustrated embodiment, that original data object (client-side) and the forward data object (server-side) will differ in that the original data object can be decrypted by decrypter 218 and the forwarded data object will remain encrypted when received as part of network communication portion 220 (and again in reverse for the case of transmitting from the server 206 to the client 202). By matching the original data object with the forwarded data object, metrics regarding the entire data object transmittal from the client 202 to the server 206 may be obtained. This is contrasted against other analysis systems that may view such forwarded or matching network communication as duplicate, and ignore or drop the forwarded network communication, instead or analyzing and deriving performance metrics from it.

As additionally described below in reference to FIGS. 3a, 3b, and 4, the matching or correlating of the data objects from different sides (client-side, server-side) or network segments (e.g., intranet, internet 295, etc.) may be based upon a pre-defined set of criteria.

In this context, a "starting data object" is a data object from one network segment or side (e.g., client-side, server-side, etc.) whose corresponding or matching data object is being searched for. From the example above, the "starting data object" may be the original data object from the client 202 to the AP device 204.

In this context, a "candidate data object" is a data object that is being tested to see if the data object corresponds or matches the starting data object. In some embodiments, this "candidate data object" may be from the other network segment (e.g., server-side, client-side, etc.) than the "starting data object". However, in various embodiments (e.g., that of FIG. 3a, etc.), the "candidate data object" may be from the same side as the "starting data object". In this context, a "matching data object" is the data object that matches or is determined to match or correspond to the "starting data object".

In various embodiments, the analyzer 219 may be configured to determine that two data objects are matched or correlated if the following criteria are met. It is understood that the below are merely a few illustrative example criteria to which the disclosed subject matter is not limited.

Do the two data objects share a common end point or destination device? If the either source or destination devices included in the header portion of the starting data object is the same as either the source or destination devices included in the header portion of the candidate data object, the two data objects are associated with the same end device (e.g., the AP device 204, etc.) and may match. In one embodiment, for example, the destination device of the starting data object and the source device of the candidate data object may both be the AP device 204. In various embodiments, this determination may be based upon the network addresses (e.g., Internet Protocol (IP) addresses, etc.) of the devices.

Are the two data objects associated with the same host device? In one embodiment, the network communication 222 (client-side) may be decryptable and, therefore, it may be possible to read the Uniform Resource Identifier (URI) or Uniform Resource Locator (URL) of the data objects that indicates the final object or resource (e.g., web page, etc.) that is the focus of the data object. From this URI the hostname may be determined.

While it may not be possible to determine the session encryption keys or session security credentials from the network tap point 210, it may be possible to determine the hostname (e.g., www.salesforce.com, etc.) or hostnames (e.g., *.salesforce.com, etc.) that are associated with the server 206 and the corresponding session key or certificate (e.g., the SSL certificate exchanged between the AP device 204 and the server 206, etc.). From that point on, any data objects using that session key or certificate may be considered to be associated with the session key or certificate's hostname(s). A hostname from a decrypted data object may be checked against the hostname associated with an encrypted data object to determine if the two data objects are associated with the same hostname. Allowances may be made for the case where a plurality of hostnames (e.g., *.salesforce.com, etc.) are associated with a particular session key or SSL certificate.

Are the starting timestamps of the two data objects within a predefined threshold? It is expected that a forwarded data object will be started or created after an original data object. In various embodiments, that period or delay in creation or starting may be limited by a predefined threshold value (e.g., 10 seconds, etc.). In some embodiments, this threshold value may be user configurable or changeable. In various embodiments, the threshold value may differ based upon the direction of the data objects (e.g., client-to-server vs. server-to-client) or the transmitting client 202 or server 206 (e.g., a first server 206 may involve more latency than a second server (not shown)). In such an embodiment, a test may determine if the starting data object and the candidate data object occur within an acceptable (based on the threshold) period of time from one another.

Are the two data objects, or at least the payload portion thereof, relatively the same size? In the case in which both data objects may be decrypted (e.g., that of FIGS. 2c and 2d) it may be possible to compare the size (e.g., in bytes, bits, or characters, etc.) directly. In such an embodiment, it may be expected that the size of two matching data objects be the same.

However, in the illustrated embodiment, one of the data objects (the server-side data object) may not be decrypted. As such, a direct size comparison may not be possible. In such an embodiment, the size of the encrypted data object may have changed due to the encryption process. In such an embodiment, a size comparison may be made to determine if the two data objects are within a predefined threshold of the same size (e.g., 70 bytes, 2%, etc.).

In various embodiments, allowances may be made for any additions or alterations made to the data objects by the AP device 204. In such an embodiment, the size threshold or a band of acceptable values may differ based upon the type of AP device 204 (e.g., squid proxy server, etc.) or the domain or server 206. For example, one AP device 204 may add either 9 or 22 bytes to an encrypted data object. In another embodiment, a particular server 206 may add either 33 or 64 bytes to an encrypted data object. Whereas, another type of AP device 204 or server 206 may change the size of an encrypted data object in way in which no pattern is discernible. In one embodiment, the threshold value may be adjusted based upon the corresponding AP device 204 or server 206 or other factors.

It is understood that the above are merely a few illustrative examples to which the disclosed subject matter is not limited. Other criteria for matching decrypted or unencrypted data objects with encrypted data objects may be employed and are within the scope of the disclosed subject matter.

Figure 2C:
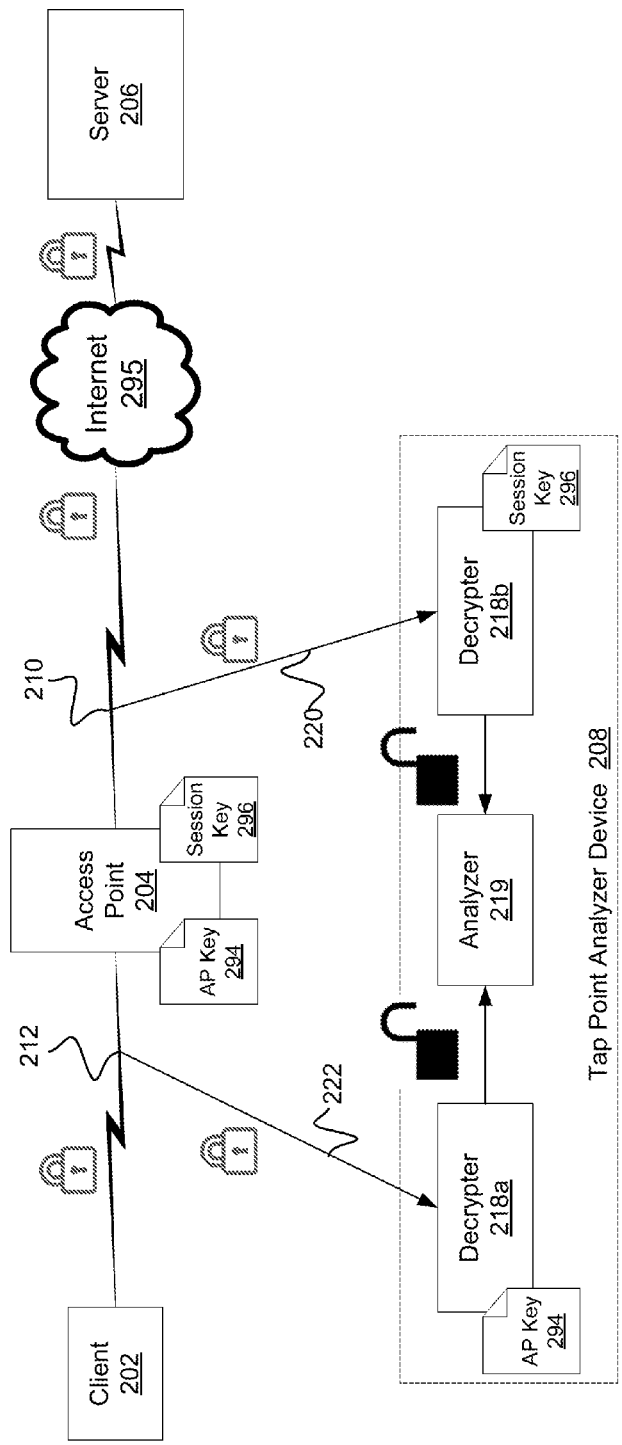
FIG. 2c is a block diagram of an example embodiment of a system in accordance with the disclosed subject matter.

FIG. 2c is a block diagram of an example embodiment of a system 200c in accordance with the disclosed subject matter. In various embodiments, the system 200c may include a client 202, an AP device 204, an internet or second network 295, and a server 206 which is accessed across or via the second network 295. In the illustrated embodiment, a system 200c shows an embodiment in which the AP device 204 is a proxy; although, it is understood that the above is merely one illustrative example to which the disclosed subject matter is not limited.

In the illustrated embodiment, two network tap points 210 and 212 are used or employed. A first or client-side network tap point 212 is placed within the intranet or first network segment between the client 202 and the AP device 204. In the illustrated embodiment, the client-side tap point 212 is placed near or at the AP device 204 as to monitor the full effect of the first network on the communication from/to the client 202. A second or server-side network tap point 210 is placed within the internet or second network segment between the server 206 and the AP device 204. In the illustrated embodiment, the server-side tap point 210 is placed near or at the AP device 204 as to monitor the full effect of the second network on the communication from/to the server 204.

In the illustrated embodiment, both the client-side and server-side network communication is encrypted (at least in part). Again, the AP device's private encryption key or security credentials 294 may be provided to the tap point analyzer device 208 such that the decrypter 218a may decrypt the monitored client-side network communication 222.

Unlike the system 200b of FIG. 2b, the tap point analyzer device 208 may be more tightly integrated with or more trusted by the AP device 204. In such an embodiment, the AP device 204 may provide the tap point analyzer device 208 with the server-side dynamic session keys or security credentials 296 for each encrypted network communication session. In various embodiments, this may allow the tap point analyzer device 208 to decrypt the monitored server-side network communication 220. In some embodiments, the AP device 204 may provide the tap point analyzer device 208 with only some of the server-side dynamic session keys or security credentials 296. The selection of which keys 296 to provide may be based upon which server 206 of a plurality of servers (not shown) the encrypted network communication session involves or other factors.

In various embodiments, the tap point analyzer device 208 may be included by the AP device 204. In the illustrated embodiment, the tap point analyzer device 208 and the AP device 204 may remain separate devices.

In the illustrated embodiment, the analyzer 219 may be configured to provide a greater analysis and more accurate metrics than that of system 200*b* of FIG. 2*b* in which only one side of the client 202/server 206 network communication was decrypted and available for deeper analysis. In such an embodiment, the analyzer 219 may be configured to correlate or match data objects or portions from the decrypted client-side network communication with data objects or portions from the decrypted server-side network communications. In various embodiments, various metrics may be provided based upon these matched data objects that include metrics for the client 202/server 206 network communication as a whole, as well as metrics for each side or portion (client-side, server-side) of the network communication.

In various embodiments, the analyzer 219 may be configured to determine that two data objects are matched or correlated if the following criteria are met. It is understood that the herein are merely a few illustrative example criteria to which the disclosed subject matter is not limited.

Do the two data objects share a common end point or destination device, as described above?

Are the starting timestamps of the two data objects within a predefined threshold, as described above?

Are the two data objects associated with the same host device, as described above? In one embodiment, as both network communications 220 and 222 (both client-side and server-side) may be decryptable and, therefore, it may be possible to read the Uniform Resource Identifier (URI) or Uniform Resource Locator (URL) of the data objects that indicates the final object or resource (e.g., web page, etc.) that is the focus of the data object. From this URI the hostname may be determined.

Do the URLs of the two data objects match exactly? Assuming the AP device 204 does not alter the URL or perform any manipulation or injection of values into the URL stem or query parameters, it is expected that the URLs of the two data objects would match exactly. It is understood that the above is merely one illustrative example to which the disclosed subject matter is not limited.

Are the two data objects the same size, as described above? As described above, it may be expected, in one embodiment, that the size of both decrypted data objects may be the same.

Are the origin and termination points of the two data objects the same? In various embodiments, one may wish to ensure that the two data objects are not duplicate (e.g., retransmitted) versions of the same data object. In such an embodiment, a check may be made to assure that the origin and termination points differ. In one embodiment, if the source network address and port address, and the destination network address and port address of the two data objects are both the same the two data objects may be considered duplicates and the candidate object may be ignored. In various embodiments, this may occur if the tap point analyzer device 208 employs a unified or common queuing scheme (e.g., as illustrated by data structure 301 of FIG. 3*a*, etc.).

It is understood that the above are merely a few illustrative examples to which the disclosed subject matter is not limited. Other criteria for matching decrypted or unencrypted data objects with encrypted data objects may be employed and are within the scope of the disclosed subject matter.

FIG. 2*d* is a block diagram of an example embodiment of a system in accordance with the disclosed subject matter. In various embodiments, the system 200*d* may include a client 202, an AP device 204, an internet or second network 295, and a server 206 which is accessed across or via the second network 295. In the illustrated embodiment, a system 200*d* shows an embodiment in which the AP device 204 is a proxy; although, it is understood that the above is merely one illustrative example to which the disclosed subject matter is not limited.

In the illustrated embodiment, two network tap points 280 and 212 are used or employed. A first or client-side network tap point 212 is placed within the intranet or first network segment between the client 202 and the AP device 204. In the illustrated embodiment, the client-side tap point 212 is placed near or at the AP device 204 as to monitor the full effect of the first network on the communication from/to the client 202. A second or server-side network tap point 280 is placed within the internet or second network segment between the server 206 and the AP device 204. However, as opposed to tap point 280 of FIGS. 2*b* and 2*c*, the tap point 280 is placed relatively near to, in a network topology sense, the server 206. In such an embodiment, the tap point 280 may represent a more traditional server-centric form of network communication monitoring.

In the illustrated embodiment, both the client-side and server-side network communication is encrypted (at least in part). Again, the AP device's private encryption key or security credentials 294 may be provided to the tap point analyzer device 208 such that the decrypter 218 may decrypt the monitored client-side network communication 222.

In the illustrated embodiment, the server 206 may provide its private encryption key or security credentials 297 to a corresponding server tap point analyzer device 268. This server tap point analyzer device 268 may use or employ the encryption key 297 to decrypt the network communication 220. The server tap point analyzer device 268 may then transmit the decrypted network communication 230 to the tap point analyzer device 208 for further analysis. In various embodiments, the tap point analyzer device 208 may analyze, correlate and match the two network communication portions 220 and 220, as described above.

In various embodiments, the decrypted network communication 230 may be transmitted in an encrypted format that may be decrypted by the tap point analyzer device 208. For example, the server tap point analyzer device 268 and the tap point analyzer device 208 may establish their own HTTPS session to securely transmit the decrypted network communication 230 in a form that is both secure and not an impediment to the tap point analyzer device 208 when analyzing the decrypted network communication 230. In such an embodiment, any encryption added by the server tap point analyzer device 268/tap point analyzer device 208 HTTPS session may be removed by the tap point analyzer device 208. In a less preferred embodiment, the decrypted network communication 230 may be transmitted to the tap point analyzer device 208 in an unencrypted format. It is understood that the above are merely a few illustrative examples to which the disclosed subject matter is not limited.

FIG. 3*a* is a block diagram of an example embodiment of a data structure 301 in accordance with the disclosed subject matter. In various embodiments, the tap point analyzer device or apparatus may store, at least in a temporary fashion, data objects from the monitored network communication between the client computing device and server computing device.

In the illustrated embodiment, the device or apparatus may store data objects from both the first network segment (e.g., the intranet, client-side, etc.) and the second network segment (e.g., the intranet, server-side, etc.) in a unified or common queue 308. In various embodiments, if additional network segments (e.g., a third or fourth network segment, etc.) are employed, data objects from those network segments may also be added to the queue 308. In various embodiments, these data objects may be stored in a first-in-first-out (FIFO) basis. It is understood that the above is merely one illustrative example to which the disclosed subject matter is not limited.

In one embodiment, a starting data object 310 may be selected from the queue 308. As described above, a plurality of candidate data objects 312 (e.g., data objects 312a, 312b, 312c, and 312d) may be selected based upon a sliding window 307. However, in such an embodiment, the candidate data objects 312 may include data objects from the same network segment (e.g., client-side, server-side, etc.) as the starting data object 310. In the illustrated embodiment, the data objects 314 are excluded from or outside the sliding window 307.

In various embodiments, the sliding window 307 may include all data objects in the queue 308. In such an embodiment, the sliding window 307 may provide, in a figurative sense, a window on the long stream of network communication that is monitored. This figurative window may slide along the stream of monitored network communication as data objects are matched or correlated. In such an embodiment, the size of the sliding window 307 and the queue 308 may be determined, at least in part, by amount of time between the start or creation time of the first data object 310 and the last data object 312f. In some embodiments, this amount of time may be a predefined value. In such an embodiment, the predefined value may be user configurable or changeable.

In various embodiments, a plurality of candidate data objects 312 (e.g., data objects 312a, 312b, 312c, 312d, 312e, and 312f, referred to collectively as data objects 312) may be selected in order to provide a number of possible matches for the starting data object 310. In one embodiment, the plurality of candidate data objects 312 may be any objects within the sliding window 307 or the queue 308.

In some embodiments, the queue 308 may include a starting window 309 that includes one or more starting data objects 312. In the illustrated embodiment, the starting window 309 only includes one starting data object 312; however, other starting window 209 sizes are possible. In various embodiments, the size of the starting window may be defined by the amount of time a data object has been in the queue 308 or, in another embodiment, the age of the data object's start time.

For example, in one embodiment, no data object may be eligible for matching or being treated as a starting data object 310 unless it is older than a predetermined amount of time (e.g., 10 seconds, etc.). In various embodiments, this may assure that enough time has passed for a corresponding or matching candidate data object 312 to be generated and placed into the queue. In various embodiments, multiple starting data objects 310 may exist if the matching process may occur in parallel or an overlapping (e.g., pipelined, etc.) fashion. In such an embodiment, the size of the starting window 209 may be determined by the number of concurrent matching tests or operations the apparatus may perform. In some embodiments, the sliding window 306 may be defined such that it includes the starting data object 310 or starts at the same data object as the starting window 309.

In another embodiment, the length or number of data objects in the queue 308 may be controlled or regulated, at least in part, by a maximum data object age threshold or value (e.g., 20 seconds, etc.). In such an embodiment, if a data object (e.g., data object 310) is older than the maximum data object age and has not been matched to any other data object, the data object may be removed from the queue 308. Likewise, in various embodiments, the queue 308 may be associated with or include a maximum size (e.g., 300,000 data objects, 1024 Mb, etc.). In such an embodiment, once the maximum number of data objects in the queue has been reached no more objects may be placed in the queue. In another embodiment, the oldest unmatched data objects may be removed to make room for new data objects. In yet another embodiment, multiple criteria may determine the size of the queue 308, for example the queue 308 may be limited to a maximum number of data objects and data objects within a certain age range (e.g., sliding window 307). In such an embodiment, any objects failing these either of these two criteria may be removed from the queue 308. It is understood that the above are merely a few illustrative examples to which the disclosed subject matter is not limited.

In various embodiments, once two (or more) data objects have been matched, they may be removed from the queue 308. In such an embodiment, the data objects may be processed by another portion of the analyzer. In various embodiments, the matched data objects may be examined to determine one or more metrics or network performance values (e.g., latency, etc.), as described above. In some embodiments, unmatched data objects that expire or are otherwise removed from the queue 308 may also be further processed to determine metrics of network performance data (e.g., errors, retries, timeouts, etc.), as described above. It is understood that the above are merely a few illustrative examples to which the disclosed subject matter is not limited.

FIG. 3b is a block diagram of an example and less preferred embodiment of a data structure 300 in accordance with the disclosed subject matter. In various embodiments, the tap point analyzer device or apparatus may store, at least in a temporary fashion, data objects or sub-portions from the monitored network communication between the client computing device and server computing device.

In the illustrated embodiment, the device or apparatus may store data objects from a first network segment (e.g., the intranet, client-side, etc.) in a queue 302. In various embodiments, the device or apparatus may store data objects from a second network segment (e.g., the intranet, server-side, etc.) in a queue 304. In various embodiments, if additional network segments (e.g., a third or fourth network segment, etc.) are employed, respective queues may also be employed.

In one embodiment, a starting data object 310 may be selected from the queue 302. Alternatively, in another embodiment, the starting object may be selected from the queue 304. In various embodiments, one or more candidate data objects 312 may be selected from the queue opposite that of the starting data object 310 (e.g., queue 304, etc.). In various embodiments, the starting data object 310 and the candidate data objects 312 may be selected such that decrypted (or unencrypted) data objects are attempted to be matched against encrypted data objects. It is understood that the above is merely one illustrative example to which the disclosed subject matter is not limited.

In various embodiments, a plurality of candidate data objects 312 may be selected in order to provide a number of possible matches for the starting data object 310. In one embodiment, the plurality of candidate data objects 312 may be selected by employing a candidate window 306. In various embodiments, the candidate window 306 may be defined by a subset of the candidate queue 304 selected based on one or more characteristics or attributes of the starting data object 310.

For example, in one embodiment, the controlling or deterministic characteristic of the starting data object 310 may be age or starting time stamp. In such an embodiment, the candidate windows 306 may include a number of data objects 312 that include a starting time stamp or age within a predetermined amount (e.g., 1 second, etc.) of the starting data object 310. In various embodiments, this may be referred to as the jitter time between the two data objects. In the illustrated embodiment, the candidate window 306 may include candidate data objects 312, 312a, 312b, and 312c (collectively referred to as candidate data objects 312). The candidate windows 306 may exclude data objects 316a, 316b, and 316c whose start times are greater than the maximum allowable or threshold jitter time from the starting data object 310.

In various embodiments, each of the candidate data objects 312 may be tested in turn, in parallel, in a pipelined fashion, or a combination thereof, to determine if each candidate data object 312 sufficiently correlates with or is a match for the starting data object 310. In some embodiments, the testing may stop once a matching candidate data object 312 is found. In another embodiment, the testing may continue until all candidate data objects 312 have been tested and the best matching candidate data object 312 (if any) is found. In yet another embodiment, the testing may continue until all candidate data objects 312 have been tested and all (if any) matching candidate data objects 312 are found.

In various embodiments, once the testing is complete, a previously non-selected data object (e.g., data object 314, data object 312a if it not previously matched data object 310, etc.) may be selected as a new starting data object and the process may repeat. In various embodiments, the selection of starting data object may move between queues 302 & 304 based on a predefined scheme or set of rules (e.g., round robin, oldest un-matched data object, etc.).

Figure 4:
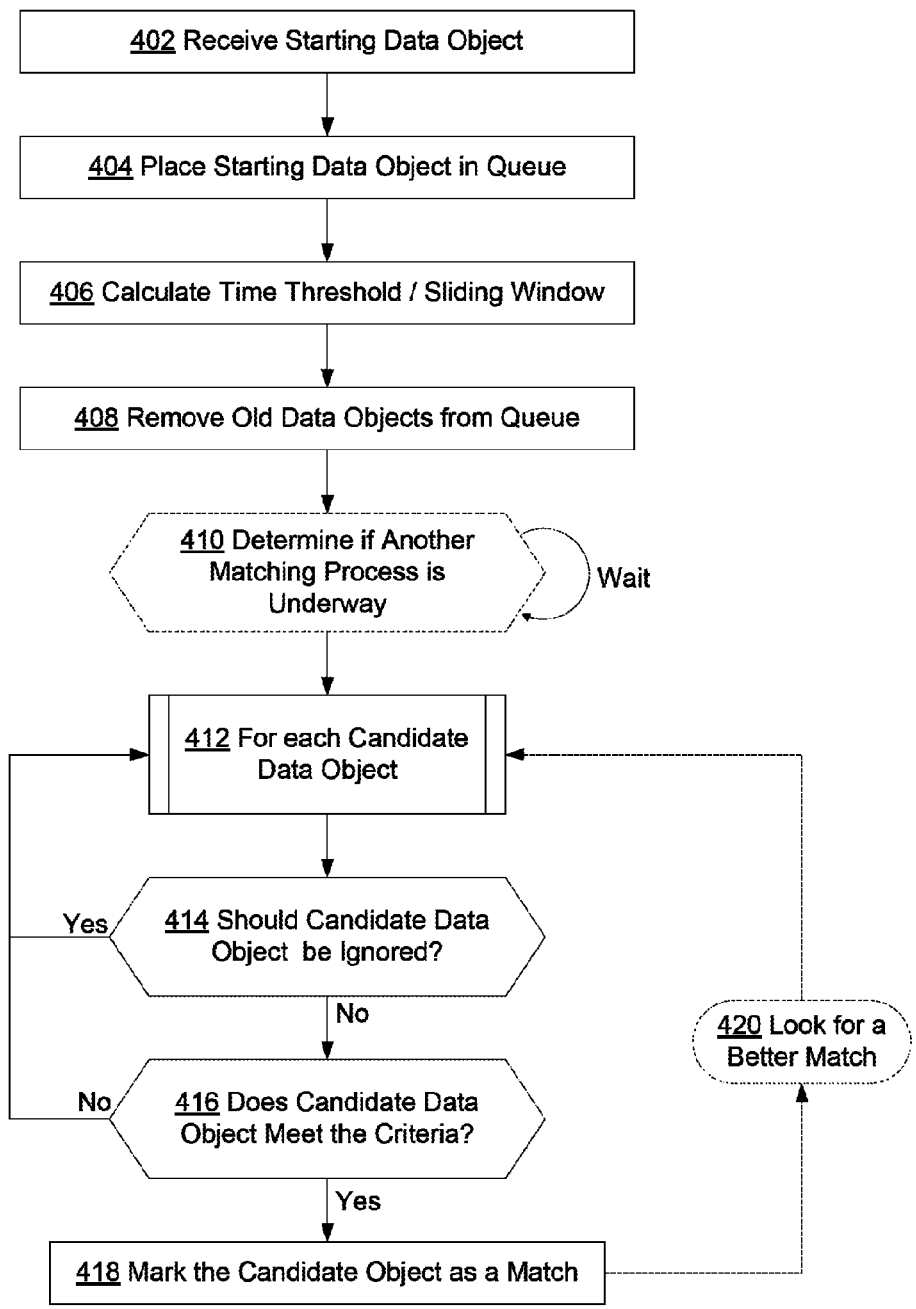
FIG. 4 is a flowchart of an example embodiment of a technique in accordance with the disclosed subject matter.

FIG. 4 is a flowchart of an example embodiment of a technique 400 in accordance with the disclosed subject matter. In various embodiments, the technique 400 may be used or produced by the systems such as those of FIGS. 1, 2a, 2b, 2c, and/or 2d. Furthermore, the data structures of FIGS. 3a and 3b may be used with some or all of technique 400. Although, it is understood that the above are merely a few illustrative examples to which the disclosed subject matter is not limited.

Block 402 illustrates that, in one embodiment, a data object or sub-portion of the monitored network communication between a client and server may be received. Block 404 illustrates that, in one embodiment, the data object mat be placed in the queue. In various embodiments, this may include determining if the queue is full. In some embodiments, this may include removing an old data object, as described above. In another embodiment, this may include not placing the data object in the queue if no old data objects may be removed (e.g., no data objects are older than the age based threshold value, etc.) and the queue is full. In yet another embodiment, this may include determining if the received data object is sufficiently old to be placed in queue (e.g., a minimum time threshold has been reached, etc.), as described above. Block 406 illustrates that, in one embodiment, the various time windows (e.g., the sliding window, etc.) may be calculated. Block 408 illustrates that, in one embodiment, any old or otherwise unwanted data objects may be removed from the queue. In some embodiments, this may also include determining if the earlier data objects in the queue are within the jitter or sliding window, and if not removing the aged data objects from the queue. In another embodiment, this may include determining which data objects are candidate objects. In yet another embodiment, other queue management tasks (e.g., memory compaction, timer updating, etc.) may occur during Blocks 404, 406 and 408.

Block 410 illustrates that, in one embodiment, a determination may be made as to whether or not another matching operation or process is underway or if a new matching operation may be undertaken. In some embodiments, multiple matching processes or operations may be undertaken simultaneously or concurrently. In another embodiment, only one matching process may be undertaken or executed at a time. In yet another embodiment, multiple matching processes may occur concurrently, but in a staggered fashion. If for some reason, a new matching process or operation may not proceed, the technique 400 may wait until the blocking event is cleared. It is understood that the above are merely a few illustrative examples to which the disclosed subject matter is not limited.

Block 412 illustrates that, in one embodiment, each candidate data object may be tested against the starting data object. As described above, in various embodiments, the matching process or operation may result or terminate if no matches are found, when a first match is found, or when all candidate data objects have been tested resulting in, in various embodiments, either a best match or multiple matches. It is understood that the above are merely a few illustrative examples to which the disclosed subject matter is not limited.

Block 414 illustrates that, in one embodiment, a determination may be made as to whether or not the candidate data object should be skipped or ignored. In various embodiments, if the starting data object is an encrypted data object and the current candidate data object is also an encrypted data object, the current candidate data object may be ignored and the next candidate data object may undergo testing (e.g., Block 412). In another embodiment, if the starting data object is a decrypted data object, the current candidate data object may proceed through the matching process regardless of whether the current candidate data object in encrypted or not. In various embodiments, other criteria may be used to determine if a candidate data object is to be ignored (e.g., the data object has been previously matched to another data object, etc.).

Block 416 illustrates that, in one embodiment, a determination may be made as to whether or not the current candidate data object met the criteria for a match. As described above, various criteria may be employed to determine if the starting data object and candidate data object match or are sufficiently correlated.

As described above in reference to FIGS. 2b, 2c, and 2d, a first set of criteria may be employed for all encrypted or decrypted data objects. Such criteria may include: a test for a common end point, a test for a common host (e.g., based on a URI and, if encrypted, an SSL certificate, etc.), and a common or similar starting time start, as described above. As described above, a second set of criteria may be employed if both the starting data object and the candidate data object are decrypted (or unencrypted). Such criteria may include: a test for a common URL, a test that the data object sizes are the same, and a test that the two data objects are not duplicates of each other, as described above. As described above, a third set of criteria may be employed if one of either the starting data object or the candidate data object are decrypted (or unencrypted) and the other data object is encrypted. Such criteria may include: a test that the data object sizes are similar within a predefined threshold, as described above. It is understood that the above are merely a few illustrative examples to which the disclosed subject matter is not limited.

As described above, the first set of criteria may be applied or employed in addition to either the second or third set of criteria. In various embodiments, the two data objects may only be considered a match if all of the employed criteria are met. In another embodiment, the two data objects may be considered a match, if a majority or a certain amount or threshold of the employed criteria are met. In some embodiments, the criteria may be distilled into a score or value by which the amount of total or absolute correlation may be determined. In such an embodiment, it may be possible to compare the amount of correlation between to candidate data objects and the starting data object.

In various embodiments, if the current candidate data object is not a match, the next candidate data object may be tested. This may continue until either a match is found or all the possible candidate data objects are exhausted.

Conversely, if the criteria are met, Block 418 illustrates that, in one embodiment, the candidate data object may be marked as a match to the starting data object. In various embodiments, a successful match may terminate the matching or correlating process. In another embodiment, Block 420 illustrates that additional candidate data objects may be tested to either find a better, more correlated match, or, in some embodiments, find a plurality of matching data objects. It is understood that the above are merely a few illustrative examples to which the disclosed subject matter is not limited.

Figure 5:
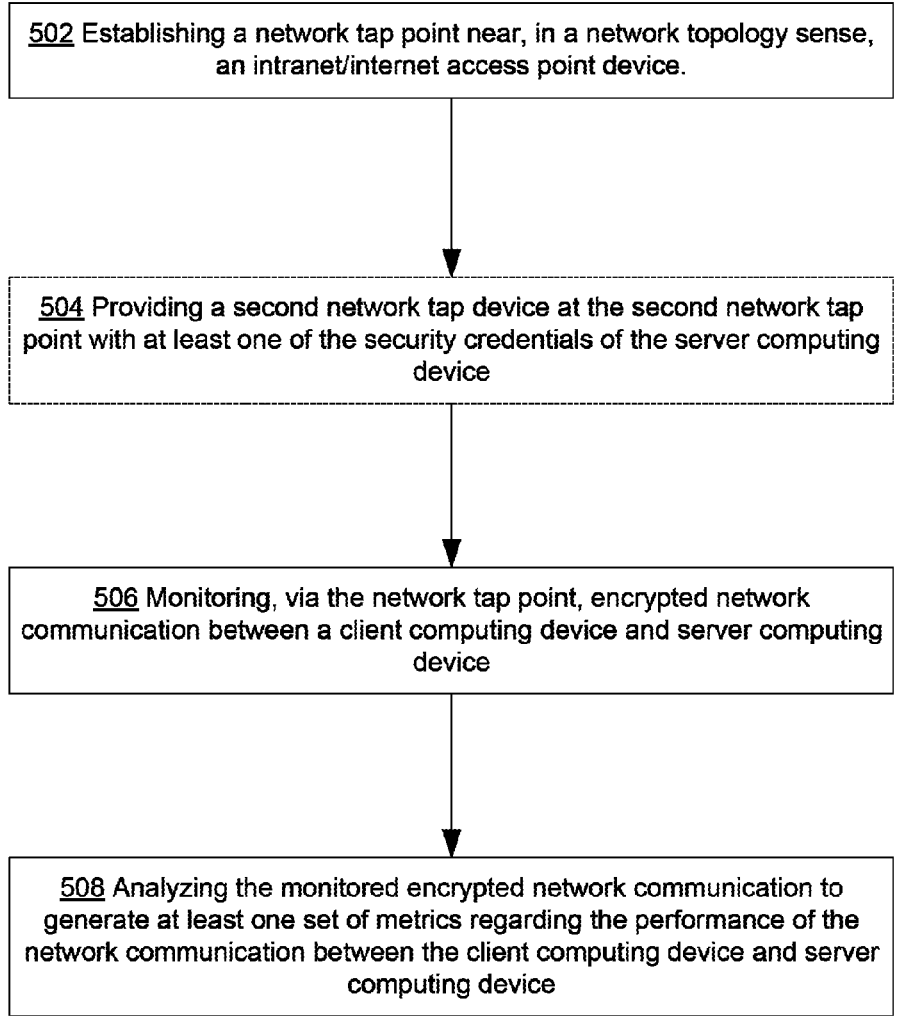
FIG. 5 is a flowchart of an example embodiment of a technique in accordance with the disclosed subject matter.

FIG. 5 is a flowchart of an example embodiment of a technique in accordance with the disclosed subject matter. In various embodiments, the technique 500 may be used or produced by the systems such as those of FIG. 1, 2a, 2b, 2c, or 2d. Furthermore, portions of technique 500 may make use of the techniques and data structures of FIGS. 3a, 3b, 4, and 6. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a network tap point may be established near, in a network topology sense, an access point device, as described above. In various embodiments, the access point device may form the boundary between a first network and a second network, as described above. In one embodiment, the network tap point may provide a substantially non-intrusive means of viewing network communication through the access point device, as described above. In some embodiments, establishing may include establishing a network tap point includes providing a network tap point analyzing device with at least one encryption credential of the intranet/internet access point device, as described above. In various embodiments, one or more of the action(s) illustrated by this Block may be performed by the apparatuses or systems of FIG. 1, 2a, 2b, 2c, or 2d, the network tap points and/or the network tap point analyzer devices of FIG. 1, 2a, 2b, 2c, or 2d, as described above.

Block 504 illustrates that, in one embodiment, a second network tap device may be provided or established at a second network tap point, as described above. In various embodiments, the second network tap point is across at least a portion of the internet or second network from the client computing device and near, in a network topology sense, the server computing device, as described above. In some embodiments, providing may include providing the second network tap device with at least one of the security credentials of the server computing device, as described above. In various embodiments, one or more of the action(s) illustrated by this Block may be performed by the apparatuses or systems of FIG. 1, 2a, 2b, 2c, or 2d, the network tap points and/or the network tap point analyzer devices of FIG. 1, 2a, 2b, 2c, or 2d, or the server tap point device 268 of FIG. 2d, as described above.

Block 506 illustrates that, in one embodiment, at least partially encrypted network communication between a client computing device that is within the first network and server computing device that is within the second network may be monitored, as described above. In various embodiments, this may occur via the network tap point, as described above. In some embodiments, monitoring may include receiving, by the network tap point analyzing device and from a second network tap point, a second portion of the network communication between the intranet/internet access point device and the server computing device, as described above. In various embodiments, the second portion of the network communication is received in a format that is either un-encrypted or decryptable by the network tap point analyzing device, as described above.

In one embodiment, monitoring may include monitoring, via the second network tap device, the second portion of the network communication between the intranet/internet access point device and the server computing device, as described above. In various embodiments, monitoring may include decrypting the monitored second portion of the network communication, as described above. In some embodiments, monitoring may include transmitting the decrypted second portion of the network communication to the network tap point analyzing device in a format that is either un-encrypted or decryptable by the network tap point analyzing device, as described above. In various embodiments, one or more of the action(s) illustrated by this Block may be performed by the apparatuses or systems of FIG. 1, 2a, 2b, 2c, or 2d, the network tap points, the monitoring or decrypting elements, and/or the network tap point analyzer devices of FIG. 1, 2a, 2b, 2c, or 2d, as described above.

Block 508 illustrates that, in one embodiment, the monitored at least partially encrypted network communication may be analyzed to generate at least one set of metrics regarding the performance of the network communication between the client computing device and server computing device, as described above. In various embodiments, analyzing may include analyzing the monitored encrypted network communication to generate a first set of metrics regarding the performance of the network communication between the client computing device and the access point device, as described above. In one embodiment, analyzing may include analyzing the monitored encrypted network communication to generate a second set of metrics regarding the performance of the network communication between the access point device and the server computing device, as described above.

In various embodiments, analyzing may include not decrypting the monitored encrypted network communication, as described above. In another embodiment, analyzing may include decrypting, by employing a private encryption key of the access point device, a first portion of the monitored network communication that is between the client computing device and the access point device, as described above. In one embodiment, analyzing may include not decrypting a second portion of the monitored network communication that is between the access point device and the server computing device, as described above. In such an embodiment, analyzing may include correlating network communications of the first decrypted portion of the monitored network communication with respective network communications of the second encrypted portion of the monitored network communication, as described above.

In various embodiments, analyzing may include decrypting, by employing a session encryption key of the access point device, a second portion of the monitored network communication that is between the intranet/internet access point device and the server computing device, as described above. In one embodiment, analyzing may include correlating network communications of the first decrypted portion of the monitored network communication with respective network communications of the second decrypted portion of the monitored network communication, as described above. In various embodiments, analyzing may include correlating network communications of the first decrypted portion of the monitored network communication with respective network communications of the second portion of the monitored network communication, as described above. In various embodiments, one or more of the action(s) illustrated by this Block may be performed by the apparatuses or systems of FIG. 1, 2a, 2b, 2c, or 2d, the network tap points, the analyzer elements, and/or the network tap point analyzer devices of FIG. 1, 2a, 2b, 2c, or 2d, as described above.

FIG. 6 is a flowchart of an example embodiment of a technique in accordance with the disclosed subject matter. In various embodiments, the technique 600 may be used or produced by the systems such as those of FIG. 1, 2a, 2b, 2c, or 2d. Furthermore, portions of technique 600 may make use of the techniques and data structures of FIGS. 3a, 3b, and 4. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, a first portion of network communication data between a client computing device and a server computing device may be received, as described above. In various embodiments receiving may include receiving via a first network tap point included by a first network segment, as described above. In some embodiments, the first portion of network communication data is either decryptable by a network tap point analyzer device or unencrypted, as described above. In various embodiments, the first network segment may include the client computing device and is included by an intranet, as described above. In various embodiments, one or more of the action(s) illustrated by this Block may be performed by the apparatuses or systems of FIG. 1, 2a, 2b, 2c, or 2d, the network tap points, the monitoring or decrypting elements, and/or the network tap point analyzer devices of FIG. 1, 2a, 2b, 2c, or 2d, as described above.

Block 604 illustrates that, in one embodiment, a second portion of network communication data between the client computing device and the server computing device may be received, as described above. In various embodiments, receiving may include receiving via a second network tap point included by a second network segment, as described above. In one embodiment, the second network segment may include an internet that is in communication with the server computing device, as described above. In various embodiments, the boundary between the first and second network segments includes an access point device, as described above. In some embodiments, the second portion of network communication may be encrypted and not decryptable by the network tap point analyzer device, as described above.

In one embodiment, receiving the second portion of network communication data may include receiving, via the second network tap point included by the second network segment, one or more security credentials that may be only partially read by the network tap point analyzer device, as described above. In various embodiments, receiving may include retrieving the hostname of the server computing device from the security credentials, as described above. In various embodiments, one or more of the action(s) illustrated by this Block may be performed by the apparatuses or systems of FIG. 1, 2a, 2b, 2c, or 2d, the network tap points, the monitoring or decrypting elements, and/or the network tap point analyzer devices of FIG. 1, 2a, 2b, 2c, or 2d, as described above.

Block 606 illustrates that, in one embodiment, an attempt may be made to correlate each sub-portion of the first portion of network communication data to corresponding sub-portion of the second portion of network communication data, as described above. In various embodiments, correlating may include determining, if a candidate data object of the second portion of network communication data corresponds with a starting data object of the first portion of network communication data, based, at least in part, upon whether the candidate object is the same size as the starting data object plus a predefined threshold value, as described above. In one embodiment, attempting to correlate may include selecting a starting data object included in the first portion of network communication data, as described above. In another embodiment, correlating may include testing one or more candidate data objects included in the second portion of network communication data to determine if the one or more candidate data objects matches the starting data object based upon a set of predefined criteria, as described above. In such an embodiment, the one or more candidate data objects included in the second portion of network communication data may be selected based upon a sliding window that defines a subset of the received second portion of network communication data, as described above.

In various embodiments, attempting to correlate may include selecting a starting data object from either the first or the second portions of network communication data, as described above. In one embodiment, correlating may include testing one or more candidate data objects to determine if the candidate data object matches the starting data object, wherein each candidate data object is selected from the portion of network communication data that does not include the starting data object, as described above. In such an embodiment, testing may include determining if the starting data object and the candidate data object match based on at least one of the criteria selected from a group of criteria comprising: the starting data object and the candidate data object include a common end-point network device, the starting data object and the candidate data object include a common start time stamp, within a predefined threshold, and the starting data object and the candidate data object include a common end-point network device that includes the same hostname, as described above.

In various embodiments, attempting to correlate may include selecting a starting data object from either the first or the second portions of network communication data, as described above. In one embodiment, correlating may include selecting a candidate data object from the portion of network communication data that does not include the starting data object, as described above. In some embodiments, correlating may include employing, regardless of whether or not the starting data object and candidate data object are encrypted or decryptable, a first set of criteria to determine if the starting data object corresponds to the candidate data object, as described above. In various embodiments, correlating may include employing, if both the starting data object and candidate data object are either unencrypted or decryptable, a second set of criteria to determine if the starting data object corresponds to the candidate data object, as described above. In some embodiments, correlating may include employing, if one of the starting data object and candidate data object is either unencrypted or decryptable and if the other of the starting data object and candidate data object is both encrypted and not decryptable, a third set of criteria to determine if the starting data object corresponds to the candidate data object, as described above. In such an embodiment, correlating may include determining that the starting and candidate data object are correspond if all employed set(s) of criteria are met, as described above. In various embodiments, one or more of the action(s) illustrated by this Block may be performed by the apparatuses or systems of FIG. 1, 2a, 2b, 2c, or 2d, the network tap points, the analyzer elements, and/or the network tap point analyzer devices of FIG. 1, 2a, 2b, 2c, or 2d, as described above.

Block 608 illustrates that, in one embodiment, the correlated network communication sub-portions may be analyzed to generate at least one set of metrics regarding the performance of the network communication between the client computing device and server computing device, as described above. In various embodiments, one or more of the action(s) illustrated by this Block may be performed by the apparatuses or systems of FIG. 1, 2a, 2b, 2c, or 2d, the network tap points, the analyzer elements, and/or the network tap point analyzer devices of FIG. 1, 2a, 2b, 2c, or 2d, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   establishing a network tap point near, in a network topology sense, an intranet/internet access point device, wherein the network tap point provides a substantially non-intrusive means of viewing network communication through the intranet/internet access point;
   monitoring, by at least one processor, at least partially encrypted network communication between a client computing device that is within the intranet and server computing device that is within the internet using the network tap point, the monitoring including receiving a first portion of the monitored network communication that is between the client computing device and the intranet/internet access point and receiving a second portion of the network communication between the intranet/internet access point device and the server computing device;
   decrypting, by the at least one processor, the first portion of the monitored network communication by employing a private encryption key of the intranet/internet access point device; and
   analyzing, by the at least one processor, the monitored at least partially encrypted network communication to generate at least one set of metrics regarding the performance of the network communication between the client computing device and server computing device,
   wherein the analyzing includes correlating network communications of the first decrypted portion of the monitored network communication with respective network communications of the second portion of the monitored network communication.

2. The method of claim 1, wherein analyzing includes:
analyzing the monitored encrypted network communication to generate a first set of metrics regarding the performance of the network communication between the client computing device and the intranet/internet access point device; and
analyzing the monitored encrypted network communication to generate a second set of metrics regarding the performance of the network communication between the intranet/internet access point device and the server computing device.

3. The method of claim 1, wherein establishing a network tap point includes providing a network tap point analyzing device with at least one encryption credential of the intranet/internet access point device.

4. The method of claim 1, wherein analyzing includes:
not decrypting the second portion of the monitored network communication that is between the intranet/internet access point device and the server computing device.

5. The method of claim 1, wherein analyzing includes:
decrypting, by employing a session encryption key of the intranet/internet access point device, the second portion of the monitored network communication that is between the intranet/internet access point device and the server computing device.

6. The method of claim 1, wherein monitoring includes:
receiving, by the network tap point analyzing device and from a second network tap point, the second portion of the network communication between the intranet/internet access point device and the server computing device, wherein the second portion of the network communication is received in a format that is either un-encrypted or decryptable by the network tap point analyzing device.

7. The method of claim 6, further comprising:
providing a second network tap device at the second network tap point with at least one of the security credentials of the server computing device, wherein the second network tap point is across at least a portion of the internet from the client computing device and near, in a network topology sense, the server computing device; and
wherein monitoring includes:
monitoring, via the second network tap device, the second portion of the network communication between the intranet/internet access point device and the server computing device,
decrypting the monitored second portion of the network communication, and
transmitting the decrypted second portion of the network communication to the network tap point analyzing device in a format that is either un-encrypted or decryptable by the network tap point analyzing device.

8. An apparatus comprising:
a network tap point configured to duplicate, in a non-intrusive manner, at least part of a network communication transmitted to and from an access point device that forms the boundary between a first network and a second network; and
a processor configured to:
monitor, via the network tap point, at least partially encrypted network communication that is between a client computing device that is within the first network and server computing device that is within the second network including receiving a first portion of the network communication that is between the client computing device and the access point device and receiving a second portion of the network communication that is between the server computing device and the access point device, and
analyze the monitored at least partially encrypted network communication to generate at least one set of metrics regarding the performance of the network communication between the client computing device and server computing device, the analyze including correlating network communications of the first portion of the monitored network communication with respective network communications of the second portion of the monitored network communication.

9. The apparatus of claim 8, wherein the processor is configured to:
analyze the monitored encrypted network communication to generate a first set of metrics regarding the performance of the network communication between the client computing device and the access point device; and
analyzing the monitored encrypted network communication to generate a second set of metrics regarding the performance of the network communication between the access point device and the server computing device.

10. The apparatus of claim 8, further comprising a memory configured to store at least one encryption credential of the access point device.

11. The apparatus of claim 8, wherein the processor is configured to:
not decrypt the second portion of the monitored network communication that is between the access point device and the server computing device.

12. The apparatus of claim 8, wherein the processor is configured to:
decrypt, by employing the private encryption key of the access point device, the second portion of the monitored network communication that is between the access point device and the server computing device.

13. The apparatus of claim 8, wherein the processor is configured to:
receive, from a second network tap point, the second portion of the network communication between the access point device and the server computing device, wherein the second portion of the network communication is received in a format that is either un-encrypted or decryptable by the apparatus.

14. A computer program product for managing a network, the computer program product being tangibly embodied on a non-transitory computer-readable medium and including executable code that, when executed, is configured to cause an apparatus to:
monitor, via a network tap point, at least partially encrypted network communication between a client computing device that is within a first network and server computing device that is within a second network including receiving a first portion of the network communication that is between the client computing device and an access point device and receiving a second portion of the network communication that is between the server computing device and the access point device;
decrypt, by employing a session encryption key of the access point device, a first portion of the monitored network communication that is between the client computing device and the access point device; and
analyze the monitored at least partially encrypted network communication to generate at least one set of metrics regarding the performance of the network communication between the client computing device and server computing device, the analyze including correlating network communications of the first portion of the monitored network communication with respective network communications of the second portion of the monitored network communication.

15. The computer program product of claim 14, wherein the executable code is configured to, when executed, cause the apparatus to:
   analyze the monitored network communication to generate a first set of metrics regarding the performance of the network communication between the client computing device and an access point device, wherein the access point device provides a boundary between the first network and the second network; and
   analyze the monitored encrypted network communication to generate a second set of metrics regarding the performance of the network communication between the access point device and the server computing device.

16. The computer program product of claim 14, wherein the executable code is configured to, when executed, cause the apparatus to:
   decrypt, by employing a session encryption key of the access point device, the second portion of the monitored network communication that is between the access point device and the server computing device.

* * * * *